United States Patent
Wu

(10) Patent No.: US 10,713,499 B2
(45) Date of Patent: Jul. 14, 2020

(54) REAL-TIME VIDEO TRIGGERING FOR TRAFFIC SURVEILLANCE AND PHOTO ENFORCEMENT APPLICATIONS USING NEAR INFRARED VIDEO ACQUISITION

(75) Inventor: Wencheng Wu, Webster, NY (US)

(73) Assignee: Conduent Business Services, LLC, Florham Park, NJ (US)

( * ) Notice: Subject to any disclaimer, the term of this patent is extended or adjusted under 35 U.S.C. 154(b) by 497 days.

(21) Appl. No.: 13/453,089

(22) Filed: Apr. 23, 2012

(65) Prior Publication Data
US 2013/0278761 A1 Oct. 24, 2013

(51) Int. Cl.
*G06K 9/00* (2006.01)
*G06K 9/20* (2006.01)
*G06K 9/32* (2006.01)
*H04N 7/18* (2006.01)

(52) U.S. Cl.
CPC ....... *G06K 9/00785* (2013.01); *G06K 9/2018* (2013.01); *G06K 9/325* (2013.01); *H04N 7/18* (2013.01)

(58) Field of Classification Search
CPC .................................................. H04N 7/18
See application file for complete search history.

(56) References Cited

U.S. PATENT DOCUMENTS

| | | | |
|---|---|---|---|
| 5,034,811 A | 7/1991 | Palm | |
| 7,916,184 B2* | 3/2011 | Utagawa | G11B 27/034 348/143 |
| 8,050,413 B2 | 11/2011 | Stephanson | |
| 8,654,848 B2* | 2/2014 | Tian | H04N 5/147 348/700 |
| 2005/0046597 A1 | 3/2005 | Hutchison et al. | |
| 2006/0165386 A1 | 7/2006 | Garoutte | |
| 2007/0069921 A1 | 3/2007 | Sefton | |
| 2007/0257819 A1 | 11/2007 | Manor | |
| 2008/0247640 A1* | 10/2008 | Ukita | G06K 9/38 382/165 |
| 2008/0278582 A1* | 11/2008 | Chung et al. | 348/159 |
| 2009/0219387 A1* | 9/2009 | Marman et al. | 348/143 |
| 2009/0238542 A1 | 9/2009 | Adiletta et al. | |
| 2011/0135156 A1 | 6/2011 | Chen et al. | |
| 2012/0169842 A1* | 7/2012 | Chuang et al. | 348/39 |

(Continued)

OTHER PUBLICATIONS

Anagnostopoulos, et al. "A License Plate-Recognition Algorithm for Intelligent Transportation System Applications." IEEE Transactions on Intelligent Transportation Systems, vol. 7, No. 3, Sep. 2006.*

(Continued)

*Primary Examiner* — Brian T Pendleton
*Assistant Examiner* — Kyle M Lotfi
(74) *Attorney, Agent, or Firm* — Ortiz & Lopez, PLLC; Kermit D. Lopez; Luis M. Ortiz

(57) ABSTRACT

A method and system for real-time video triggering for traffic surveillance and photo enforcement comprises receiving a streaming video feed and performing a spatial uniformity correction on each frame of the streaming video feed and resampling the video feed to a lower spatial resolution. Motion blobs are then detected. Next a three-layered approach is used to identify candidate motion blobs which can be output to a triggering module to trigger a video collection action.

20 Claims, 5 Drawing Sheets

(56) References Cited

U.S. PATENT DOCUMENTS

2012/0179742 A1* 7/2012 Acharya .............. H04N 7/18
                                                    709/202
2014/0044361 A1* 2/2014 Lee .................... G06K 9/6211
                                                    382/201

OTHER PUBLICATIONS

L. Dlagnekov, "License Plate Detection Using AdaBoost", Mar. 2004, San Diego, CA: Comput. Sci. Eng. Dept., Univ. California, San Diego.*
Mehran Kafa et al.i, "Dynamic Bayesian Networks for Vehicle Classification in Video," IEEE Transactions on Industrial Informatics, vol. 8, No. 1, Feb. 2012.*
U.S. Appl. No. 13/401,142, filed Feb. 21, 2012, Wu et al.
U.S. Appl. No. 13/411,032, filed Mar. 2, 2012, Kozitsky et al.
U.S. Appl. No. 13/253,261, filed Sep. 30, 2011, Wu et al.
U.S. Appl. No. 13/277,719, filed Oct. 20, 2011, Bulan et al.
GB Search Report for GB1306844.0 dated Oct. 17, 2013.

\* cited by examiner

REAL-TIME VIDEO TRIGGERING FOR TRAFFIC SURVEILLANCE AND PHOTO ENFORCEMENT APPLICATIONS USING NEAR INFRARED VIDEO ACQUISITION

TECHNICAL FIELD

Embodiments are generally related to the field of tracking applications. Embodiments are also related to methods and systems for video triggering applications. Embodiments are additionally related to methods and systems for real-time video triggering and traffic surveillance.

BACKGROUND OF THE INVENTION

Object tracking has become increasingly prevalent in modern applications. This is particularly true in the field of vehicle tracking and surveillance. It is increasingly necessary for improved "triggering" to initiate and/or terminate image acquisition.

For example, in the cases of vehicle surveillance and traffic enforcement, an initial triggering step is generally required to mark the beginning of an event of interest. Several methods are known in the art for performing a triggering step. The most common of these is the use of an inductive loop located beneath the pavement of a road. Inductive loops can be expensive to install and maintain under the pavement. Therefore a need exists for an improved triggering system and method for traffic surveillance applications.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for object tracking.

It is another aspect of the disclosed embodiments to provide for an enhanced method and system for triggering video acquisition.

It is yet another aspect of the disclosed embodiments to provide an enhanced method and system for real-time video triggering of traffic surveillance and photo enforcement applications.

The aforementioned aspects and other objectives and advantages can now be achieved as described herein. A method and system for real-time video triggering for traffic surveillance and photo enforcement comprises receiving a streaming video feed and performing a spatial uniformity correction on each frame of the streaming video feed. This step can only be performed when an associated ambient light level is low. The streaming video feed can then be resampled to a lower spatial resolution.

Detection of a plurality of motion blobs in the resampled video stream next allows identification of candidate motion blobs from the plurality of motion blobs in the resampled video stream as candidates for triggering a video or photographic collection action. Motion blobs identified as candidates are output to trigger a video collection action.

The streaming video feed comprises high-resolution near infrared streaming video. The detection of a plurality of motion blobs in the resampled video stream can also comprise analyzing the resampled video using bi-directional frame to frame differences and/or labeling an initial foreground and background in the resampled video stream, and applying morphological filtering to the labeled video frame to identify a plurality of motion blobs in the resampled video stream.

Indentifying candidate motion blobs from the plurality of motion blobs as candidates for triggering a video collection action can include a three-layered approach which includes eliminating any motion blob from the plurality of motion blobs in the resampled video stream as a candidate motion blob if the size and aspect ratio of the motion blob are not within a predefined size and aspect ratio range; eliminating any motion blob from the remaining plurality of motion blobs at an original resolution as a candidate motion blob if the standard deviation of the intensity of the motion blob does not fit a predefined characteristic signature; and eliminating a motion blob from the remaining plurality of motion blobs at an original resolution as a candidate motion blob if the motion blob is not identified as a candidate motion blob by a candidate motion blob classifier.

The output can include a plurality of coordinates of centroids and a bounding box associated with the candidate motion blobs. The candidate motion blobs can comprise license plates and the streaming video feed can comprise a traffic surveillance video feed.

A system for real-time video triggering comprises a video camera and a video receiving module for receiving streaming video from the video camera. A spatial uniformity correction module applies a spatial uniformity correction to the streaming video feed when an associated ambient light level is low. The streaming video feed is then resampled with a resampling module configured to receive the streaming video feed and resample it to a lower spatial resolution.

A detection module is configured to detect a plurality of motion blobs in the resampled video stream. Then an identification module identifies candidate motion blob from the plurality of motion blobs as candidates for triggering a video or photographic collection action. An output module can provide candidate motion blobs to a triggering module configured to trigger a video collection action.

The detection module is further configured to analyze the resampled video using bi-directional frame to frame differences, label an initial foreground and background, and apply morphological filtering to the labeled video frames to identify a plurality of motion blobs in said resampled video stream.

The identification module is further configured to apply a three layered approach wherein any motion blob from the plurality of motion blobs in the resampled video stream is eliminated as a candidate motion blob if the size and aspect ratio of the motion blob are not within a predefined size and aspect ratio range; any motion blob from the remaining plurality of motion blobs at an original resolution are eliminated as a candidate motion blob if the standard deviation of intensity of the motion blob does not fit a predefined characteristic signature; and any motion blob from the remaining plurality of motion blobs at an original resolution are eliminated as a candidate motion blob if the motion blob is not identified as a candidate motion blob by a candidate motion blob classifier.

The output module of the system is further configured to output a plurality of coordinates of centroids and a bounding box associated with the said candidate motion blobs to a triggering module to trigger a collection action.

The candidate motion blobs can comprise license plates and the video camera can comprise a high-resolution near infrared video camera configured to collect high-resolution near infrared streaming video comprising a traffic surveillance video feed.

A computer program product comprises a computer-usable data carrier storing instructions that, when executed by a computer, cause the computer to perform a method of real-time video triggering. The method comprises receiving a streaming video feed and performing a spatial uniformity correction on each frame of the streaming video feed. This step can only be performed when an associated ambient light level is low. The streaming video feed can then be resampled to a lower spatial resolution.

Detection of a plurality of motion blobs in the resampled video stream next allows identification of candidate motion blobs from the plurality of motion blobs as candidates for triggering a video or photographic collection action. Motion blobs identified as candidates are output to trigger a video collection action.

The streaming video feed comprises high-resolution near infrared streaming video. The detection of a plurality of motion blobs in the resampled video stream can also comprise analyzing the resampled video using bi-directional frame to frame differences and/or labeling an initial foreground and background in the resampled video stream, and applying morphological filtering to the labeled video frame to identify a plurality of motion blobs in the resampled video stream.

Indentifying candidate motion blobs from the plurality of motion blobs as candidates for triggering a video collection action can include a three-layered approach which includes eliminating any motion blob from the plurality of motion blobs in the resampled video stream as a candidate motion blob if a size and aspect ratio of the motion blob are not within a predefined size and aspect ratio range; eliminating any motion blob from the remaining plurality of motion blobs at an original resolution as a candidate motion blob if a standard deviation of the intensity of the motion blob does not fit a predefined characteristic signature; and eliminating a motion blob from the remaining plurality of motion blobs at an original resolution as a candidate motion blob if the motion blob is not identified as a candidate motion blob by a candidate motion blob classifier.

The output can include a plurality of coordinates of centroids and a bounding box associated with the candidate motion blobs. The candidate motion blobs can comprise license plates and the streaming video feed can comprise a traffic surveillance video feed.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
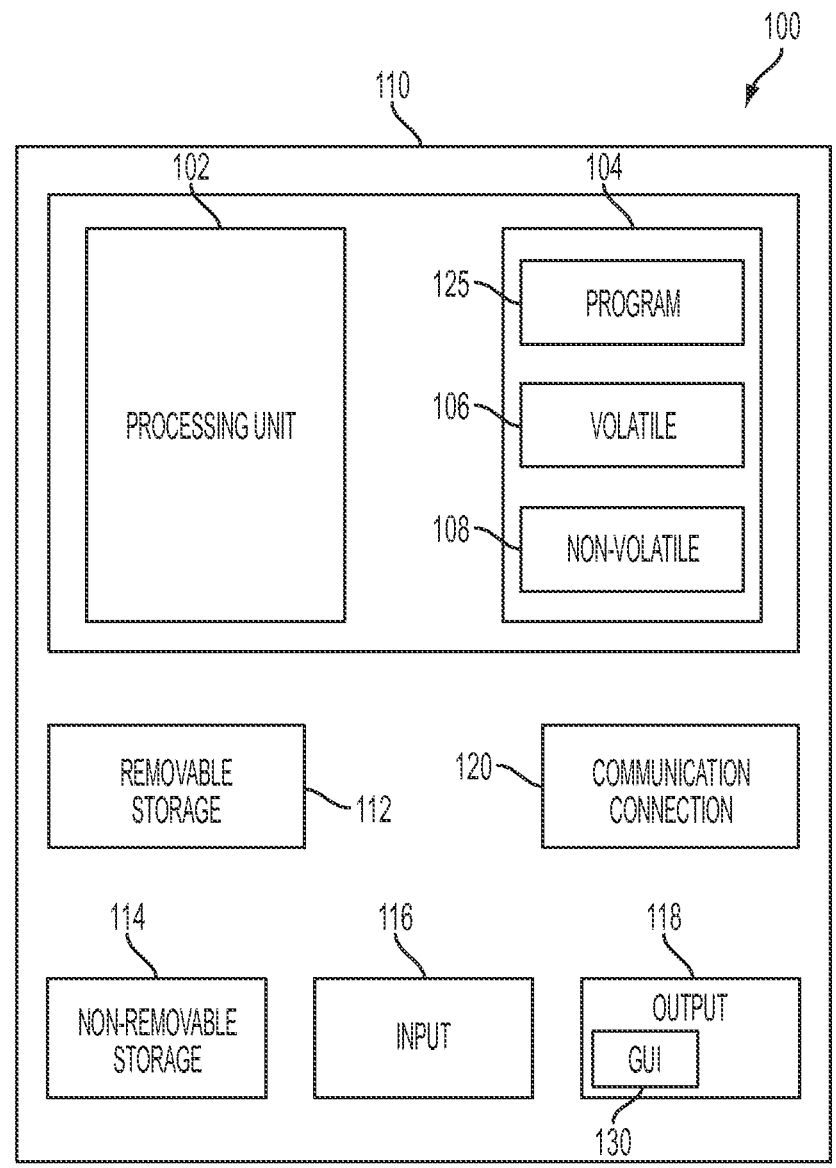
FIG. 1 depicts a block diagram of a computer system which is implemented in accordance with the disclosed embodiments.

A block diagram of a computer system 100 that executes programming for executing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including video frames.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a photographic camera, video camera, tracking device, or the like. The communication connection may include a Local Area Network (LAN), a Wide Area Network (WAN) or other networks. This functionality is described in more detail in FIG. 2.

Output 118 is most commonly provided as a computer monitor but may include any computer output device. Output 118 may also include a data collection apparatus associated with computer system 100. In addition, input 116, which commonly includes a computer keyboard and/or pointing device such as a computer mouse, allows a user to select and instruct computer system 100. A user interface can be provided using output 118 and input 116.

Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125 which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

Figure 2:
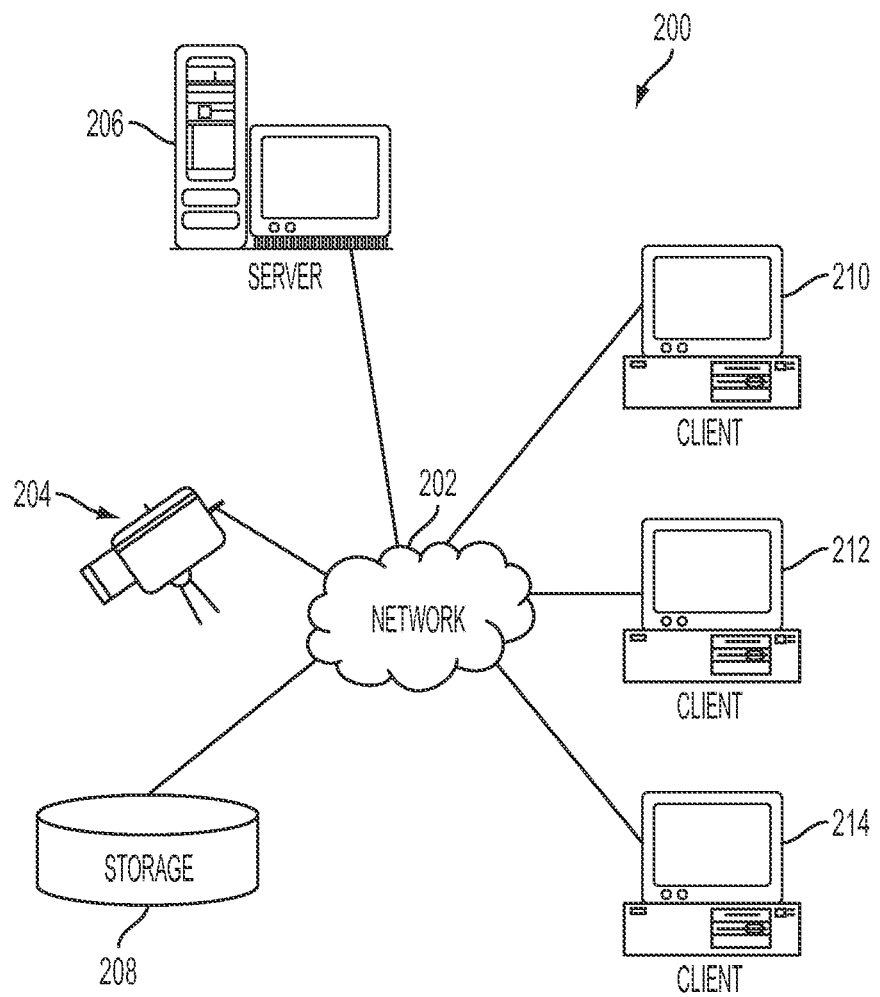
FIG. 2 depicts a graphical representation of a network of data-processing devices in which aspects of the present invention may be implemented.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as video camera 204, and a memory storage unit such as, for example, memory or database 208.

In the depicted example, video camera 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively clients 210, 212, and 214 may be, for example, a photographic camera, video camera, tracking device, etc.

Computer system 100 can also be implemented as a server such as server 206, depending upon design considerations. In the depicted example, server 206 provides data such as boot files, operating system images, applications, and application updates to clients 210, 212, and 214. Clients 210, 212, and 214 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

The following description is presented with respect to embodiments of the present invention, which can be embodied in the context of a data-processing system such as computer system 100, in conjunction with program module 125, and data-processing system 200 and network 202 depicted in FIGS. 1 and 2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Figure 3:
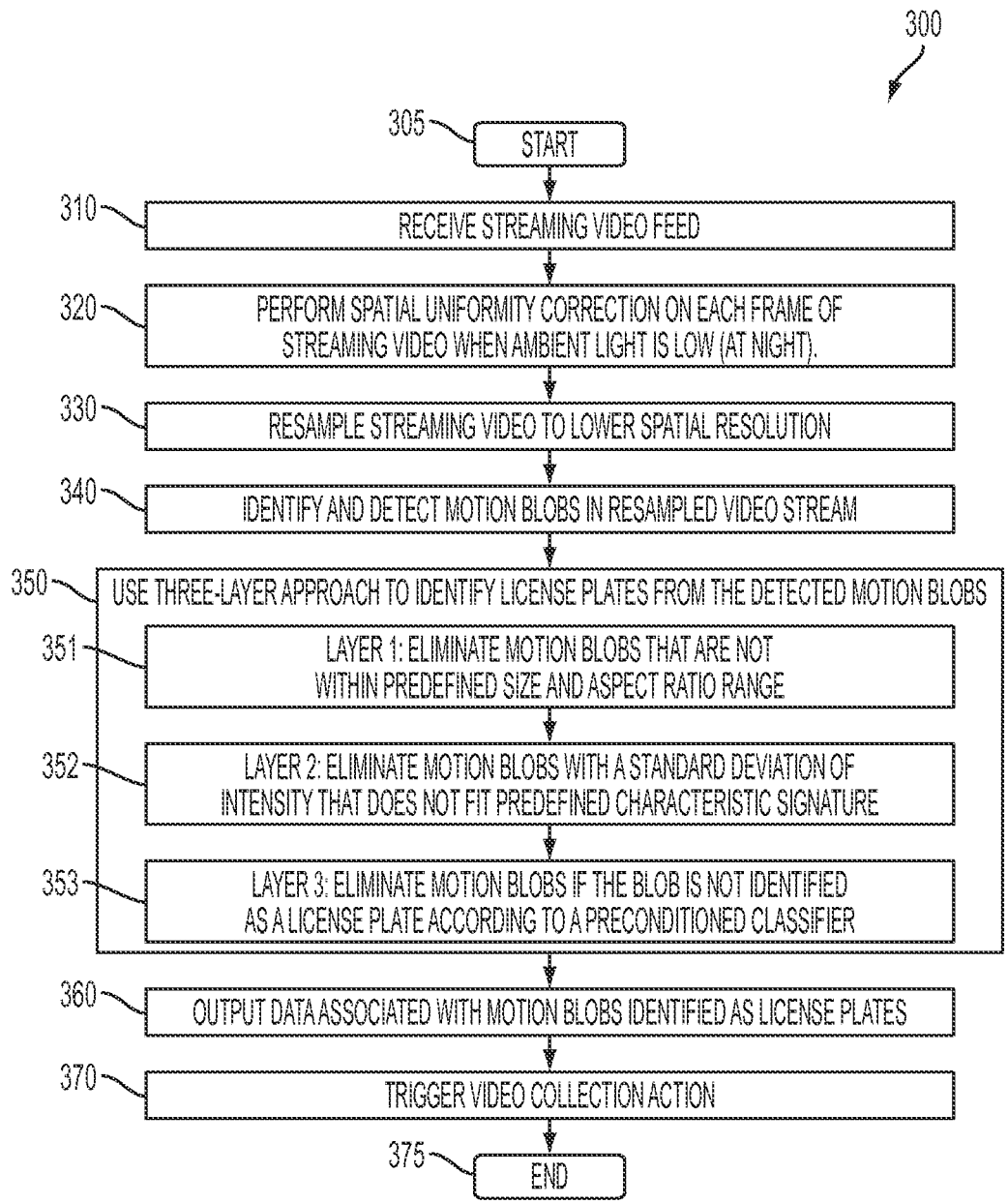
FIG. 3 depicts a high level flow chart illustrating logical operational steps in a real-time video triggering method in accordance with the disclosed embodiments.

FIG. 3 illustrates a high level flow chart 300 of logical operations steps associated with a real time video triggering method in accordance with the disclosed embodiments. This method allows for real time, or very near real time, video triggering in surveillance applications. Most commonly, this method can be used in traffic management, monitoring, fee collection, and photo enforcement applications. As a target object passes through a detection zone it is necessary to trigger video surveillance of the target to reduce the total video that needs to be stored. To that end, a triggering event is used to mark when data collection should start or end. The method begins at block 305.

Block 310 indicates that streaming video data is received from a video camera. This video camera is configured to collect high-resolution, near-infrared video data. The streaming video frames preferably have a high frame rate and high spatial resolution. The video camera may be deployed in any environment where it is necessary to perform video recording. This may be, for example, a traffic intersection where a triggering action associated with a motorist running a red light triggers video acquisition so that the motorist can be issued a ticket. However, one skilled in the art will appreciate that any number of other situations may advantageously use the triggering method described herein.

Next, at block 320 a spatial uniformity correction is preformed on each frame of the collected streaming video when the ambient light level is low and an external auxiliary light source is turned on. An external near infrared light source which may or may not be associated with the video camera can be used to illuminate the target. These light sources generally have a characteristic circular signature where the intensity is maximal at the focus and gradually decreases moving away from the focal point. This is a common signature for external light sources such as, for example, streetlights, traffic lights, etc. This makes detection of a triggering event much more difficult when the target is far from the focus such as, for example, when a vehicle is in an outer lane.

In a preferred embodiment, the spatial uniformity correction is only preformed when the ambient light level is low, such as at night, and an external light source is being used to illuminate the target. During the day, the main source of illumination is daylight from the sun, which does not have the same characteristic circular signature and therefore does not require any correction.

It is important to note that this correction method will not introduce noise when applied in an environment without external illumination. However, in that case, it is also a computational waste. Thus, in a preferred embodiment of the present invention, the correction method is only applied when the ambient light level is low and an external light source, such as a streetlight or similar external light source, is the main light source.

The method then continues to step 330 where the incoming high temporal and high spatial video stream is re-sampled to lower spatial resolution. Unlike video tracking or video identification methods, which require very fine spatial resolution, the present method does not require such fine spatial resolution. Thus, the spatial resolution is resampled in each row and column by a factor of M. In a preferred embodiment, M=8 which corresponds to a spatial resolution reduction by a factor of 64.

Figure 4:
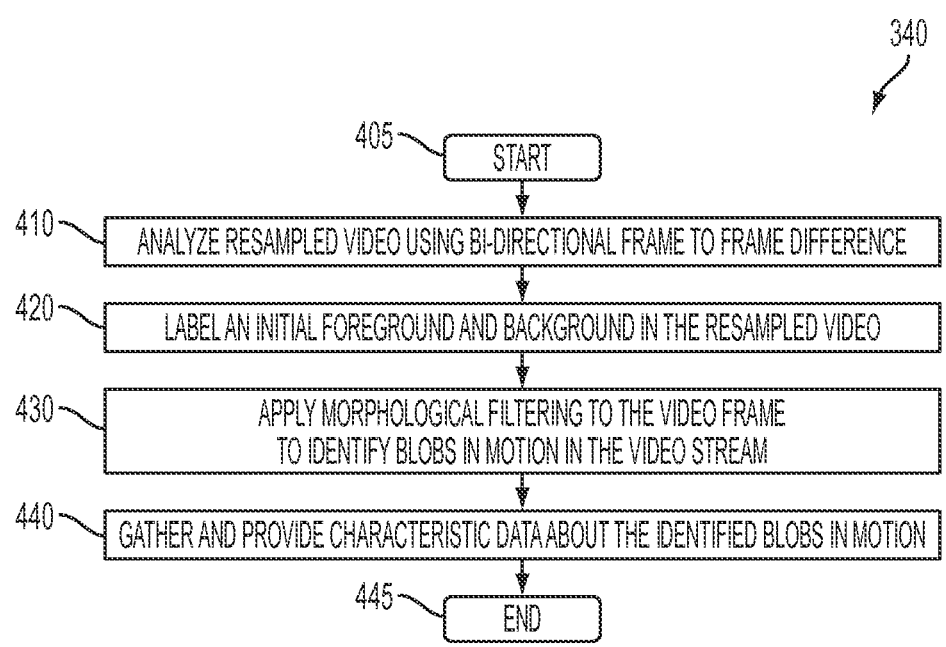
FIG. 4 depicts a detailed flow chart illustrating logical operational steps for detecting motion blobs in a resampled video stream.

Block 340 illustrates that after the incoming video has been resampled, the method next detects and identifies motion blobs that may be indicative of a target that should activate the trigger. This can involve several different techniques used independently or in conjunction as illustrated by FIG. 4. The method starts as indicated by block 405. A bi-directional frame-to-frame differences technique, or "double differences", can be used as described by block 410. Double differences can take advantage of baseline and end-line comparisons to account for differences in the collected data.

In addition, thresholding can be used to label initial foreground and/or background pixels as illustrated at block 420. Block 430 then shows that morphological filtering techniques such as image closing, hole filling, or other known techniques can be applied to form candidate motion blobs for further processing.

The next step is to output the dimensional characteristics of the motion blobs as indicated at block 440. These characteristics may include motion blob mask, centroids, sizes, bounding boxes, aspect ratios, and the like. The output may include for example coordinates of these characteristics. The method of block 440 can then end at block 445.

As block 350 indicates, a three-layer approach is next used to identify license plates, or candidate motion blobs, from the detected motion blobs and their characteristics provided at block 340. The first layer eliminates motion blobs that are not within a predefined size and aspect ratio range, as shown at block 351. This step is premised on the use of near infrared video acquisition as discussed above. Taking advantage of near infrared external light sources and using a video camera system which preferably includes a near infrared band-pass filter, preferably set at 870 nm, means that license plates will reflect a much stronger intensity of light than other parts of the vehicle (except tail lights as discussed below). Thus, a predefined size and aspect ratio range indicative of a license plate can be used to quickly filter out false motion blobs such as, for example, the movement of leaves on trees, pedestrians, etc.

The step indicated at block 351 can be thought of as the first layer of detection of the described invention. This step only offers rough accuracy, but requires relatively small data acquisition and is not processor intensive. Thus, this step can be executed using on-board or remote computing very quickly using hardware and software implementations according to the structures shown in FIGS. 1 and 2.

The second layer is shown at block 352. The candidate license plate blobs that have filtered through the first layer are next subject to a second layer of analysis. In this layer, the coordinates of the bounding boxes are used to crop out blob regions that are potentially license plates from the image frame. These steps are preformed on the image at its original resolution. For example, for a field of view covering approximately 100 feet in the direction of traffic flow and using a 4-Mega pixel camera, there are on the order of 20 thousand pixels per license plate. Histogram equalization can then be used to enhance the blob image and provide better contrast.

The mean intensity of the blob and standard deviation of intensity are then used to further eliminate false candidate blobs. Specifically, vehicle taillights tend to have a smaller standard deviation of intensity than license plates and the mean intensity of tail lights tends to be higher. When these characteristics do not fit a predefined characteristic signature, the associated blob can be eliminated.

Finally, at block 353 the third layer of detection is implemented. Here, a preconditioned classifier is used to identify license plates and eliminate any motion blobs not identified as license plates according to the classifier. In a preferred embodiment, the preconditioned classifier is a license plate vs. tail light classifier. The classifier requires blob regions at their original resolution.

To implement the classifier, a liner discriminate analysis classifier operates on a histogram of gradient feature vectors. Other combinations of classifiers and features can also be used. A support-vector machine (SVM) classifier and Histogram of Oriented Gradients (HOG) feature, SVM classifier and Scale-invariant feature transform (SIFT) feature, Adaboost classifier and HOG feature, and/or Adaboost and SIFT feature can be used as well.

For example, "training license plate images" and "training "ON" tail-light images" can be used to both positively and negatively train, and thereby construct, the classifier. The classifier can then be applied to the blob regions at their original resolution to determine if the blob is a taillight or a license plate.

The method then moves on to block 360 wherein the data associated with the identified license plates is provided to an external triggering mechanism that can trigger a video collection action as illustrated at block 370. This data may be, for example, frame number, time stamp, and the coordinates of centroids and bounding boxes that have been identified as license plates using the three-layered approach of block 350.

It should be noted that the actual step of triggering is application dependent. For example, the triggering may be speed dependent, vehicle dependent, or time dependent. Likewise, the triggering may be for vehicle tracking or for identifying specific vehicles.

The three layered approach described in FIG. 3 provides significant computational efficiency and accuracy. The first layer shown in block 351 is very fast and can advantageously remove blobs that are obviously not license plates. Block 352 illustrates the second layer which is somewhat more computationally intense but also more accurate in removing non-license plate blobs. Finally, the third layer shown at block 353 is the most computationally expensive and would be too slow to practically apply on its own. However, the first two layers of blocks 351 and 352 are designed to eliminate enough blobs that the processing of the third layer remains viable for a small number of candidates.

Figure 5:
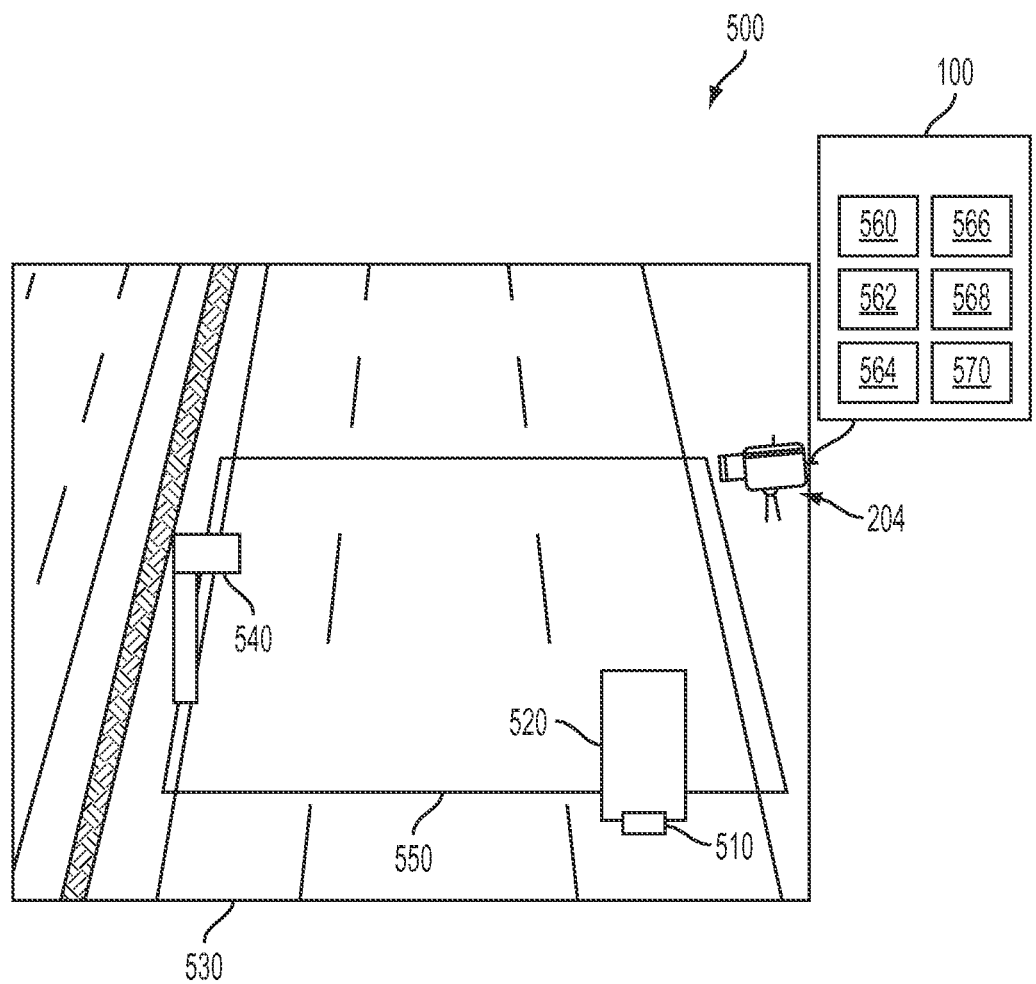
FIG. 5 depicts a system for real time video triggering in accordance with the disclosed embodiments.

FIG. 5 illustrates a system 500 for real time video triggering in accordance with the disclosed embodiments. In a preferred embodiment, the system is deployed in an environment 530 such as along a street, as shown in FIG. 5. The environment 530 may also be any other environment where triggering of video capture is needed.

Within environment 530, a vehicle 520 with an associated license plate 510 may be present on a roadway, in an intersection, in a parking facility or any other such environment. A high frame rate, high-resolution video camera 204 may be located along the roadway. In addition, an external light source 540 may also be present in the environment 530 to illuminate the roadway for motorists. The present invention may take advantage of such external light sources. Alternatively, a light source may be provided internal to the system to illuminate targets when necessary.

Video camera 204 may be operably connected with a computer system 100 and/or network 200 as illustrated in FIGS. 1 and 2. In FIG. 5, computer system 100 is shown with a number of associated modules used to implement the processing steps shown in FIGS. 3 and 4. It should be noted that these modules may alternatively be integrated with video camera 204.

As vehicle 520 and license plate 510 enter the field of view, or detection zone 550 of video camera 204, video camera 204 provides streaming video to a video receiving module associated with computer system 100. Spatial uniformity module 560 then applies a spatial uniformity correction to the received streaming video. Resampling module 562 can then resample the video to a lower spatial resolution.

A detection module 564 then detects moving blobs such as vehicle 520 and license plate 510 moving through environment 530. An identification module 566 implements the method steps shown in block 350 to identify, for example, license plate 510 that may demand triggering. An output module 568 then provides characteristics of the candidate blob to a triggering module 570 configured to trigger a video collection action.

Based on the foregoing, it can be appreciated that a number of embodiments, preferred and alternative, are disclosed herein. For example, in one embodiment, a method and system for real-time video triggering for traffic surveillance and photo enforcement comprises receiving a streaming video feed and performing a spatial uniformity correction on each frame of the streaming video feed. This step can only be performed when an associated ambient light level is low. The streaming video feed can then be resampled to a lower spatial resolution.

Detection of a plurality of motion blobs in the resampled video stream next allows identification of candidate motion blobs from the plurality of motion blobs in the resampled video stream as candidates for triggering a video or photographic collection action. Motion blobs identified as candidates are output to trigger a video collection action.

The streaming video feed comprises high-resolution near infrared streaming video. The detection of a plurality of motion blobs in the resampled video stream can also comprise analyzing the resampled video using bi-directional frame to frame differences, and/or labeling an initial foreground and background in the resampled video stream, and applying morphological filtering to the labeled video frame to identify a plurality of motion blobs in the resampled video stream.

Indentifying candidate motion blobs from the plurality of motion blobs as candidates for triggering a video collection action can include a three-layered approach which includes eliminating any motion blob from the plurality of motion blobs in the resampled video stream as a candidate motion blob if the size and aspect ratio of the motion blob are not within a predefined size and aspect ratio range; eliminating any motion blob from the remaining plurality of motion blobs at an original resolution as a candidate motion blob if the standard deviation of the intensity of the motion blob does not fit a predefined characteristic signature; and eliminating a motion blob from the remaining plurality of motion blobs at an original resolution as a candidate motion blob if the motion blob is not identified as a candidate motion blob by a candidate motion blob classifier.

The output can include a plurality of coordinates of centroids and a bounding box associated with the candidate motion blobs. The candidate motion blobs can comprise license plates and the streaming video feed can comprise a traffic surveillance video feed.

A system for real-time video triggering comprises a video camera and a video receiving module for receiving streaming video from the video camera. A spatial uniformity correction module applies a spatial uniformity correction to the streaming video feed when an associated ambient light level is low. The streaming video feed is then resampled with a resampling module configured to receive the streaming video feed and resample it to a lower spatial resolution.

A detection module is configured to detect a plurality of motion blobs in the resampled video stream. Then an identification module identifies candidate motion blobs from the plurality of motion blobs as candidates for triggering a video or photographic collection action. An output module can provide candidate motion blobs to a triggering module configured to trigger a video collection action.

The detection module is further configured to analyze the resampled video using bi-directional frame to frame differences, label an initial foreground and background, and apply morphological filtering to the labeled video frames to identify a plurality of motion blobs in said resampled video stream.

The identification module is further configured to apply a three layered approach wherein any motion blob from the plurality of motion blobs in the resampled video stream is eliminated as a candidate motion blob if the size and aspect ratio of the motion blob are not within a predefined size and aspect ratio range; any motion blob from the remaining plurality of motion blobs at an original resolution are eliminated as a candidate motion blob if the standard deviation of intensity of the motion blob does not fit a predefined characteristic signature; and any motion blob from the remaining plurality of motion blobs at an original resolution are eliminated as a candidate motion blob if the motion blob is not identified as a candidate motion blob by a candidate motion blob classifier.

The output module of the system is further configured to output a plurality of coordinates of centroids and a bounding box associated with the said candidate motion blobs to a triggering module to trigger a collection action.

The candidate motion blobs can comprise license plates and the video camera can comprise a high-resolution near infrared video camera configured to collect high-resolution near infrared streaming video comprising a traffic surveillance video feed.

A computer program product comprises a computer-usable data carrier storing instructions that, when executed by a computer, cause the computer to perform a method of real-time video triggering. The method comprises receiving a streaming video feed and performing a spatial uniformity correction on each frame of the streaming video feed. This step can only be performed when an associated ambient light level is low. The streaming video feed can then be resampled to a lower spatial resolution.

Detection of a plurality of motion blobs in the resampled video stream next allows identification of candidate motion blobs from the plurality of motion blobs as candidates for triggering a video or photographic collection action. Motion blobs identified as candidates are output to trigger a video collection action.

The streaming video feed comprises high-resolution near infrared streaming video. The detection of a plurality of motion blobs in the resampled video stream can also comprise analyzing the resampled video using bi-directional frame to frame differences, and/or labeling an initial foreground and background in the resampled video stream, and applying morphological filtering to the labeled video frame to identify a plurality of motion blobs in the resampled video stream.

Indentifying candidate motion blobs from the plurality of motion blobs as candidates for triggering a video collection action can include a three-layered approach which includes eliminating any motion blob from the plurality of motion blobs in the resampled video stream as a candidate motion blob if a size and aspect ratio of the motion blob are not within a predefined size and aspect ratio range; eliminating any motion blob from the remaining plurality of motion blobs at an original resolution as a candidate motion blob if a standard deviation of the intensity of the motion blob does not fit a predefined characteristic signature; and eliminating a motion blob from the remaining plurality of motion blobs at an original resolution as a candidate motion blob if the motion blob is not identified as a candidate motion blob by a candidate motion blob classifier.

The output can include a plurality of coordinates of centroids and a bounding box associated with the candidate motion blobs. The candidate motion blobs can comprise license plates and the streaming video feed can comprises a traffic surveillance video feed.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for real-time video triggering comprising:
    receiving a streaming video feed from a video camera with a non-transitory computer readable medium and a computer-usable data carrier storing instructions that, when executed by a computer, cause the computer to perform a function, wherein said streaming video feed comprises high-resolution near infrared streaming video filtered with a 870 nm band pass filter;
    resampling said streaming video to a lower spatial resolution of said streaming video with a non-transitory computer readable medium and a computer-usable data carrier storing instructions that, when executed by a computer, cause the computer to perform a function, wherein each row of said streaming video is resampled by a factor of 8 and each column of said streaming video is resampled by a factor of 8;
    detecting a plurality of motion blobs in said resampled video stream with a non-transitory computer readable medium and a computer-usable data carrier storing instructions that, when executed by a computer, cause the computer to perform a function, wherein detecting said plurality of motion blobs further comprises analyzing said resampled video and providing dimensional characteristics of said plurality of motion blobs, wherein said plurality of motion blobs are indicative of a target that should activate said triggering;
    eliminating candidate motion blobs from said plurality of motion blobs as candidates for triggering a photo enforcement application with a non-transitory computer readable medium and a computer-usable data carrier storing instructions that, when executed by a computer, cause the computer to perform a function, according to a filtering approach comprising three ordered filtering layers, a first computationally inexpensive layer configured to eliminate candidate motion blobs according to size, a second layer configured to eliminate candidate motion blobs, not eliminated in said first layer, according to intensity, and a third layer configured to eliminate candidate motion blobs, not eliminated in said first layer and said second layer, according to a classifier;
    outputting said remaining candidate motion blobs not eliminated in said first layer, said second layer, and said third layer; and
    triggering said photo enforcement application according to said output of said remaining candidate motion blobs with a trigger associated with a non-transitory computer readable medium and a computer-usable data carrier storing instructions that, when executed by a computer, cause the computer to perform a function;
    wherein detecting a plurality of motion blobs in said resampled video stream further comprises: labeling an initial foreground and background in said resampled video stream; and applying morphological filtering to said labeled video frame to identify a plurality of motion blobs in said resampled video stream wherein said dimensional characteristics of said plurality of motion blobs comprise motion blob mask dimensional characteristics, centroid dimensional characteristics, size, bounding box dimensional characteristics, and aspect ratio;
    wherein detecting a plurality of motion blobs in said resampled video stream further comprises:
        labeling an initial foreground and background in said resampled video stream; and
        applying morphological filtering to said labeled video frame to identify a plurality of motion blobs in said resampled video stream wherein said dimensional characteristics of said plurality of motion blobs comprise motion blob mask dimensional characteristics, centroid dimensional characteristics, size, bounding box dimensional characteristics, and aspect ratio; and
    wherein identifying candidate motion blobs from said plurality of motion blobs as candidates for triggering said photo enforcement application further comprises:
        first eliminating any motion blob from said plurality of motion blobs in said resampled video stream as a candidate motion blob if a size and aspect ratio of said motion blob are not within a predefined size and aspect ratio range indicative of a vehicle license plate with said first computationally inexpensive layer configured to eliminate candidate motion blobs according to size;
        second eliminating any motion blob from said remaining plurality of motion blobs at original resolution as a candidate motion blob if a mean intensity of said motion blob and a standard deviation of an intensity of said motion blob does not fit a predefined characteristic signature of a vehicle license plate with said second layer configured to eliminate candidate motion blobs, not eliminated in said first layer, according to intensity; and
        third eliminating a motion blob from said remaining plurality of motion blobs at original resolution as a candidate motion blob if said motion blob is not identified as a candidate motion blob by a candidate motion blob classifier, wherein said motion blob classifier is a linear discriminate analysis license plate vs. tail light classifier operating on a histogram of gradient feature vectors, with said third layer configured to eliminate candidate motion blobs, not eliminated in said first layer and said second layer, according to a classifier.

2. The method of claim 1 wherein outputting said candidate motion blobs further comprises outputting a frame number.

3. The method of claim 2 wherein outputting said candidate motion blobs further comprises outputting a plurality of centroids.

4. The method of claim 1 wherein outputting said candidate motion blobs further comprises outputting a plurality of coordinates of a bounding box associated with each of said candidate motion blobs.

5. The method of claim 1 wherein outputting said candidate motion blobs further comprises:
outputting a frame number, a time stamp, a plurality of coordinates of centroids, and a plurality of coordinates of a bounding box associated with each of said candidate motion blobs.

6. The method of claim 5 wherein said candidate motion blobs comprise license plates.

7. The method of claim 1 wherein said streaming video feed comprises a traffic surveillance video feed.

8. The method of claim 1 further comprising:
performing a spatial uniformity correction on each frame of said streaming video feed wherein said spatial uniformity correction performed on each frame of said streaming video feed is only performed when an associated ambient light level is low and an artificial light source is used to illuminate said target.

9. A system for real-time video triggering comprising:
a video camera;
a computer system comprising a processor that communicates electronically with a memory, and a non-transitory computer-usable medium embodying computer program code stored in said memory, said non-transitory computer-usable medium capable of communicating with said processor, said computer program code comprising instruction modules executable by said processor;
a video receiving module for receiving a streaming video feed from said video camera, wherein said video camera is configured to collect high-resolution near infrared streaming video filtered with a 870 nm band pass filter;
a resampling module configured to receive said streaming video feed and resample said streaming video to a lower spatial resolution of said streaming video, wherein each row of said streaming video is resampled by a factor of 8 and each column of said streaming video is resampled by a factor of 8;
a detection module configured to detect a plurality of motion blobs in said resampled video stream wherein detecting said plurality of motion blobs further comprises analyzing said resampled video and providing dimensional characteristics of said plurality of motion blobs, wherein said plurality of motion blobs are indicative of a target that should activate said triggering;
an identification module configured to eliminate candidate motion blobs from said plurality of motion blobs as candidates for triggering a photo enforcement application according to a filtering approach comprising three ordered filtering layers, a first computationally inexpensive layer configured to eliminate candidate motion blobs according to size, a second layer configured to eliminate candidate motion blobs not eliminated in said first layer according to intensity, and a third layer configured to eliminate candidate motion blobs not eliminated in said first layer and said second layer according to a classifier;
an output module wherein said remaining candidate motion blobs not eliminated in said first layer, said second layer, and said third layer are provided to a triggering module configured to trigger a collection action;
wherein said detection module is further configured to:
label an initial foreground and background in said resampled video stream; and
apply morphological filtering to said labeled video frame to identify a plurality of motion blobs in said resampled video stream wherein said dimensional characteristics of said plurality of motion blobs comprise motion blob mask dimensional characteristics, centroid dimensional characteristics, size, bounding box dimensional characteristics, and aspect ratio;
wherein said detection module is further configured to:
label an initial foreground and background in said resampled video stream; and
apply morphological filtering to said labeled video frame to identify a plurality of motion blobs in said resampled video stream wherein said dimensional characteristics of said plurality of motion blobs comprise motion blob mask dimensional characteristics, centroid dimensional characteristics, size, bounding box dimensional characteristics, and aspect ratio; and
wherein said identification module is further configured to:
first eliminate any motion blob from said plurality of motion blobs in said resampled video stream as a candidate motion blob if a size and aspect ratio of said motion blob are not within a predefined size and aspect ratio range indicative of a vehicle license plate with said first computationally inexpensive layer configured to eliminate candidate motion blobs according to size;
second eliminate any motion blob from said remaining plurality of motion blobs at original resolution as a candidate motion blob if a mean intensity of said motion blob and a standard deviation of an intensity of said motion blob does not fit a predefined characteristic signature of a vehicle license plate with said second layer configured to eliminate candidate motion blobs, not eliminated in said first layer, according to intensity; and
third eliminate a motion blob from said remaining plurality of motion blobs at original resolution as a candidate motion blob if said motion blob is not identified as a candidate motion blob by a candidate motion blob classifier, wherein said motion blob classifier is a linear discriminate analysis license plate vs. tail light classifier operating on a histogram of gradient feature vectors, with said third layer configured to eliminate candidate motion blobs, not eliminated in said first layer and said second layer, according to a classifier.

10. The system of claim 9 wherein outputting of said candidate motion blobs by said output module comprises outputting a frame number.

11. The system of claim 9 wherein outputting of said candidate motion blobs by said output module comprises outputting a plurality of centroids.

12. The system of claim 9 wherein outputting of said candidate motion blobs by said output module further comprises outputting a plurality of coordinates of a bounding box associated with each of said candidate motion blobs.

13. The system of claim 9 wherein said output module is further configured to:
output a frame number, a time stamp, a plurality of coordinates of centroids, and a plurality of coordinates of a bounding box associated with each of said candidate motion blobs to a triggering module.

14. The system of claim 13 wherein said candidate motion blobs comprise license plates.

15. The system of claim 9 wherein said streaming video feed comprises a traffic surveillance video feed.

16. The system of claim 9 further comprising a spatial uniformity correction module wherein a spatial uniformity correction is applied to said streaming video feed and said spatial uniformity correction preformed on each frame of said streaming video feed is only performed when an associated ambient light level is low and an artificial light source is used to illuminate said target.

17. An apparatus comprising:
a video camera for collecting streaming video; and
a computer program product comprising: a non-transitory computer readable medium and a computer-usable data carrier storing instructions that, when executed by a computer, cause the computer to perform a method of real-time video triggering, the method comprising:
receiving a streaming video feed from said video camera;
resampling said streaming video to a lower spatial resolution of said streaming video, wherein each row of said streaming video is resampled by a factor of 8 and each column of said streaming video is resampled by a factor of 8;
detecting a plurality of motion blobs in said resampled video stream wherein detecting said plurality of motion blobs further comprises analyzing said resampled video and providing dimensional characteristics of said plurality of motion blobs, wherein said plurality of motion blobs are indicative of a target that should activate said triggering by labeling an initial foreground and background in said resampled video stream;
applying morphological filtering to said resampled video stream to identify a plurality of motion blobs in said resampled video stream;
providing dimensional characteristics of said plurality of motion blobs comprising motion blob mask dimensional characteristics, centroid dimensional characteristics, size, bounding box dimensional characteristics, and aspect ratio according to a three layered filtering approach comprising;
first eliminating any motion blob from said plurality of motion blobs in said resampled video stream as a candidate motion blob if a size and aspect ratio of said motion blob are not within a predefined size and aspect ratio range indicative of a vehicle license plate;
next eliminating any motion blob from said remaining plurality of motion blobs at original resolution as a candidate motion blob if a mean intensity of said motion blob and a standard deviation of an intensity of said motion blob does not fit a predefined characteristic signature of a vehicle license plate;
next eliminating a motion blob from said remaining plurality of motion blobs at original resolution as a candidate motion blob if said motion blob is not identified as a candidate motion blob by a candidate motion blob classifier video stream as candidates for triggering photo enforcement application action, wherein said motion blob classifier is a linear discriminate analysis license plate vs. tail light classifier operating on a histogram of gradient feature vectors;
outputting a plurality of coordinates of centroids and a bounding box associated with said candidate motion blobs not eliminated in said first layer, said second layer, and said third layer; and
triggering said photo enforcement application with a trigger.

18. The computer program product of claim 17, wherein said streaming video feed comprises high-resolution near infrared streaming video filtered with a 870 nm band pass filter.

19. The computer program product of claim 18, wherein said candidate motion blobs comprise license plates.

20. The method of claim 18, wherein said spatial uniformity correction preformed on each frame of said streaming video feed is only performed when an associated ambient light level is low and an artificial light source is used to illuminate the target.

* * * * *